March 1, 1932.  E. FINSEN  1,847,604
CHUCK
Filed Oct. 1, 1930  2 Sheets-Sheet 1

INVENTOR
Eyvind Finsen
BY
his ATTORNEY

Patented Mar. 1, 1932

1,847,604

UNITED STATES PATENT OFFICE

EYVIND FINSEN, OF ROCHESTER, NEW YORK, ASSIGNOR TO GLEASON WORKS, OF ROCHESTER, NEW YORK, A CORPORATION OF NEW YORK

CHUCK

Application filed October 1, 1930. Serial No. 485,661.

The present invention relates to control mechanism and particularly to hydraulically operated mechanism such as may be used in conjunction with a spring-operated chuck for releasing the chuck.

The present invention constitutes an improvement over the invention disclosed in my prior application No. 368,033, filed June 3, 1929. Its purpose, in general, is to provide a mechanism which will require less labor on the part of the operator to operate and also to provide a mechanism by means of which greater pressures can be exerted than is possible with the manually operated mechanism of my prior application. When the present invention is employed in connection with a hydraulically released spring-operated chuck, the latter feature is of noteworthy importance for chucking pressures of many times those practical with the mechanism of my prior application can be employed and released. The limiting factor to the size of the springs which can be employed in a spring-operated chuck and, therefore, to the size of the gears which can be chucked with such a chuck has always been the amount of pressure which can be exerted to release the chuck against the resistance of the spring. With the present improvement, the field of spring-operated chucks is very much extended.

While not limited to this particular use, the invention has been illustrated as incorporated in a chucking mechanism. The chuck is actuated into chucking position by spring pressure and is released by hydraulic pressure. The hydraulic pressure is applied by actuation of a plunger-pump which is connected by suitable piping with one end of a piston which is secured to the draw-bar of the chuck. The spring, that serves to actuate the draw-bar into chucking position, operates against the other face of this piston.

In the invention of my prior application, the plunger-pump was actuated to compress the spring and release the chuck by operating a hand-lever which was pivotally connected to the plunger of the pump. When the type of work requires that the operator chuck and dechuck a large number of pieces in a day, the manipulation of the hand-lever may, in the course of a day, become an irksome, muscle-tiring task. Then, too, there is a very evident limit to the amount of pressure that can be applied by a manually operated pump to compress a spring of the size and character which must be employed in a spring-operated chuck to hold the work securely during operations thereon, even though the area of the piston secured to the draw-bar of the chuck be made larger than the area of the pump plunger to multiply the power applied at the piston.

In the improved chucking mechanism of the present invention, fluid pressure is employed to actuate the plunger-pump and the operator is relieved of the burdensome portion of the chucking job. In the preferred construction, a piston is secured directly to the plunger of the pump and all that is required in order to actuate the pump is to admit hydraulic pressure to one end of this piston. The area of the piston connected to the plunger is made larger than the area of the plunger so that by application of a comparatively small amount of pressure to the plunger-piston, a comparatively large pressure can be exerted on the chuck piston, thus enabling the employment of very heavy springs in the chucking mechanism and thus increasing the field of use of the chucking mechanism. Where the machine on which the chuck is used is equipped with a constantly running lubricating or cutting-oil pump, this pump can be connected by suitable piping with the plunger-piston and all that the operator has to do to operate the chuck is to move a control valve to permit flow of the pressure fluid from the machine pump into the plunger-piston chamber or from the plunger-piston chamber back to the sump. Instead, therefore, of having to manipulate a lever to generate the pressure, all that an operator has to do with the improved mechanism of the present invention is to move a control valve to open the plunger-piston to the pressure already being generated by the machine pump. It is obvious, of course, that by suitable arrangement, the chucking and dechucking can be made fully automatic and the control valve operated automatically from the machine itself.

As in my prior construction, a valve is incorporated in the plunger-pump, which is automatically opened when the plunger is raised, to permit flow of the motive fluid from or into the plunger pump system to maintain the correct volume of motive fluid in the system and permit chucking of workpieces of different thicknesses. As the plunger-pump system operates by hydraulic pressure, the present mechanism is constructed, also, so as to permit pumping of any air which may become entrapped in the pump system out of this system.

The principal objects of the invention have already been described. Other objects thereof will be apparent hereinafter from the specification and from the recital of the appended claims.

Figure 1:
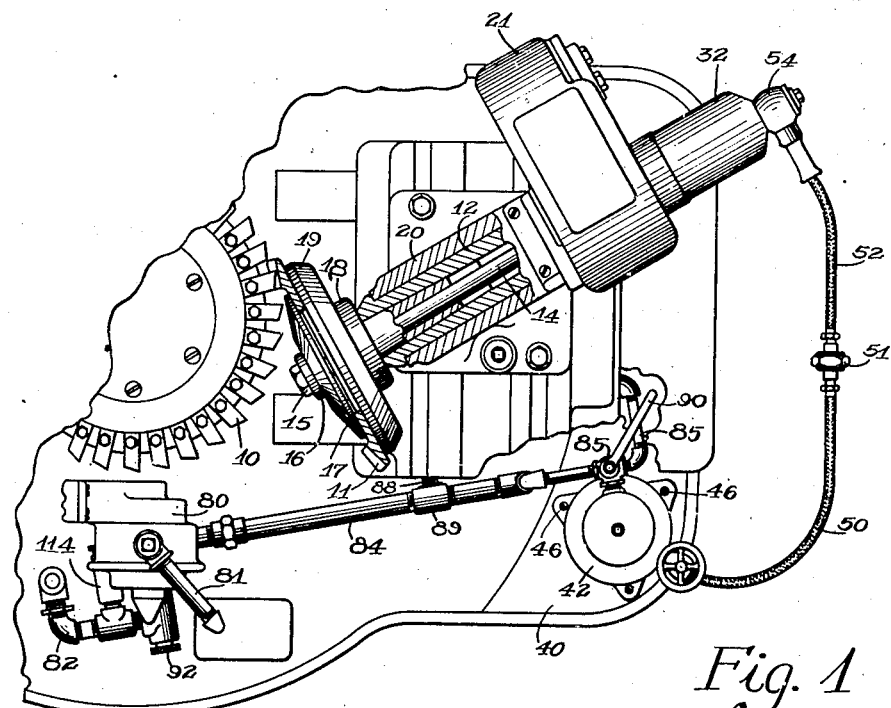
Figure 1 is a fragmentary plan view of a bevel gear roughing machine equipped with a chucking mechanism constructed according to a preferred embodiment of this invention.

The improved chucking mechanism is shown as used on a bevel gear roughing machine of the type covered by Patent No. 1,344,879, issued June 29, 1920 to James E. Gleason et al. In this machine a milling cutter of large diameter is employed to rough-cut simultaneously a plurality of bevel gear blanks. In the drawings, only one of the work heads is shown, but it will be understood that the chucking mechanism may be used on all of the work heads of the machine.

10 indicates the milling cutter and 11 one of the gear blanks being cut.

The gear blank 11 is secured to the work spindle 12 by clamping mechanism now to be described. This includes the draw-bar 14, which has a hexagonal head, indicated at 15, the horseshoe washer 16, the clamping disc 17, and the arbor 18 with which is formed integral the backing-plate 19. As is customary, the shank of the arbor 18 is tapered to correspond to the taper of the bore of the work spindle. In chucking a gear, the arbor is inserted in the work spindle and the gear blank, clamping disc and horseshoe washer slipped on the draw-bar. When the draw-bar is drawn backward in the spindle 12, the gear is forced against the arbor and the arbor in turn forced into the tapered bore of the spindle, while the horseshoe washer 16 and clamping disc 17, serve to clamp the gear blank against the arbor. To take off the blank, the draw-bar is released so that the operator can remove the horseshoe washer from the draw-bar and then the clamping disc 17 and blank 11 can be removed.

Instead of the clamping mechanism described, any other suitable type of clamping mechanism may be employed with the present invention, as, for instance, a collet chuck.

20 designates the bearing for the work spindle and 21 the housing or guard which encloses the index mechanism.

The work-clamping mechanism is constantly urged into and held in chucking position by the coil-spring 22. This spring surrounds the draw-bar 14 and abuts at one end against a collar 24 and at its other end against one face of a hollow piston 25. The draw-bar 14 passes through the collar 24 which seats in the bore of the work spindle 12. The draw-bar is of reduced diameter adjacent its inner end and the piston 25 is secured to the draw-bar by being clamped against the shoulder 27 so formed by the disc 29, the leather washer 30, and the nut 28, the latter threading onto the inner end of the draw-bar.

The piston 25 slides in a cylinder 32, which is secured to the work spindle 12, by means of a nut 33, which is threaded onto the spindle 12 and threads into the cylinder 32. Set-screws 34 and 35 are provided to hold the nut 33 against rotation relative to the work spindle 12 and the cylinder 32, respectively. By hollowing out the piston 25 to receive the spring 22, as described, the parts can be kept within small compass.

To compress the spring 22 and release the chuck, fluid pressure is applied to the piston 25.

Mounted on the base or frame of the machine at a point convenient to the operator, is a pressure chamber 42. This chamber is cast in two parts, the base 43 and the cylinder 44. The cylinder, which is closed at its upper end and is open at its lower end, is secured to the base 43 by screws 45, while the base is secured to the base of the machine by bolts 46.

The base casting 43 is formed to provide a centrally located cylinder 47 that serves as the chamber of a plunger-pump, the piston of which is designated at 70. The pump-chamber 47 is connected by a duct 48 with a valve 49 that is threaded into the base 43. The valve 49 is connected by means of the flexible hose 50, the union 51, and the flexible hose 52 with a duct 53 that is formed in a sleeve 54. This sleeve is journaled on a bearing 55 formed on the outer end of the cylinder 32 and on a collar 56 aligned with said bearing 55 and spaced therefrom. The collar 56 is mounted on a stud 57 which is secured in a bore in the bearing portion 55 of the cylinder 32 by means of a pin 58.

The duct 53 in the sleeve 54 communicates with a circular groove 60 formed partially in the sleeve 54 and partially in the stud 57.

This groove 60, in turn, communicates with a transverse duct 61 in the stud 57. The duct 61 opens into a longitudinal duct 62 in the stud 57, which opens into the chamber of the cylinder 32 and which communicates, also, with transverse ducts 63 opening, also, into the chamber of the cylinder 32.

The collar 56 is secured to the stud 57 by a nut 65 and washer 66. The sleeve 54 is provided so that rotation of the cylinder 32, during indexing movement of the work spindle 12, may take place without affecting the hydraulic connection between the pump chamber 47 and the cylinder 32. Leather cup-washers 68 are provided at the two sides of the sleeve 54 to prevent leakage of the pressure fluid around the stud 57. The bell-shaped guard 69 secured to the sleeve 54 serves to protect the end of the hose 52 at its connection with the sleeve 54.

The cylinder 32, pump chamber 47, and the piping connecting this cylinder and chamber are intended to operate as a closed hydraulic system containing a substantially constant volume of liquid. The piston 25 is in chucking position in Figure 2. To release the chuck it is intended that the motive fluid of the system be forced out of the pump chamber 47 through the piping 50, 51 and 52, into the cylinder 32, to compress the spring 22 and force the draw-bar 44 forward in the work spindle 12 to released position.

It is impossible, however, to secure absolute uniformity in the dimensions of gear blanks. Some blanks of a lot, for instance, will always be slightly thicker than others. If the plunger-pump system, comprising the chamber 47, the cylinder 32 and the lines connecting these two, were to remain closed at all times so as to contain an absolutely constant volume of fluid, the chucking attachment would not be flexible enough to take care of the variations in gear sizes which normally occur in practice. If the volume of fluid in the system was invariable, the draw-bar could never be drawn back more than a fixed distance. Then, if a gear a few thousandths of an inch thinner than standard were to occur in the lot, the chuck would not operate properly because the draw-bar could not be drawn back far enough to clamp this particular blank.

To meet the varying conditions which occur in practice, the same remedy is resorted to which was employed in the chucking mechanism described in my prior application above mentioned. That is, the plunger-pump system is opened automatically, when the plunger is released, to allow fluid to flow freely from or into the system. To this end, an opening 97 is provided in the bottom of the pump chamber 47 and this opening communicates with a reservoir 98 formed in the hollow base-casting 43. The plunger 70 is hollowed out to receive the stem 95 of a valve 96 and this valve is adapted to close the opening 97 which leads into the pump chamber 95 when the pump plunger is depressed.

The valve stem 95 is threaded at its upper end to receive the nut 99 and the lock-nut 100. When the plunger 70 is raised, the bushing 102 which is threaded into the lower end of the plunger engages the nut 99 raising the valve 95 and opening the duct 97. Thus, when the plunger is raised, the liquid in the plunger-pump system is free to flow from the system into the reservoir 98 and so, if there is a thin blank on the work spindle, the draw-bar can move far enough back to chuck it.

There is an additional advantage in using a valve 96. Leakage in the system is bound to occur. With the valve opening automatically, each time the chuck is operated, the system will be automatically kept full enough to operate for if the oil in the system falls below the amount required to operate the release, oil will be drawn into the system from the reservoir 98 on the up-stroke of the valve stem.

Hydraulic pressure is employed for actuating the plunger-pump. To this end, a piston 72 is secured to the plunger 70. This piston is clamped against the shoulder 73 formed on the periphery of the plunger 70, by means of the nut 74, disc 75 and leather-washer 76. The piston 72 fits closely the bore of the cylinder 44 and the leather-washer 76 prevents leakage of the motive fluid along the piston. The piston is normally held in the raised position shown in Figure 2, to move the plunger 70 to raised position, by means of a coil-spring 78. This spring 78 is interposed between the lower end of the piston 72 and the webs 79 of the base casting 43.

On the bevel gear roughing machine illustrated, there is an oil-pump which runs continuously while the machine is in operation. This pump is employed for pumping the coolant or cutting-oil onto the gears and cutter at the points of cutting. This pump is used, also, in the illustrated embodiment of the present invention, to supply the fluid for moving the piston 72 against the resistance of the spring 78 to actuate the pump plunger 70.

80 designates the oil-pump. It is mounted on the base 40 of the machine. The coolant or cutting-oil is drawn by this pump from a sump in the base of the machine through the pipe 81 and is pumped to the cutting points through the piping 82. For the purposes of the present invention, a line 84 is, also, connected to the piping 82 or directly to the pump. This line 84 is connected to the three-way valve 85 that is threaded into the opening 86 in the side wall of the cylinder 44. A pipe-line 87 connected with the valve 85 leads back from the valve to the sump. Through the line 84, the valve 85, and the duct 86, the same fluid which is used as a coolant, is supplied to the chamber 42 to operate the piston 72 against the resistance of the spring 78.

The line 88 connected by the T 89 in the line 84 carries the motive fluid to the other control valves 85 and chambers 42 for the other chucks of the machine.

The valve 85 is an ordinary three-way valve of any suitable construction. It is manipulated by the lever 90.

Figure 3:
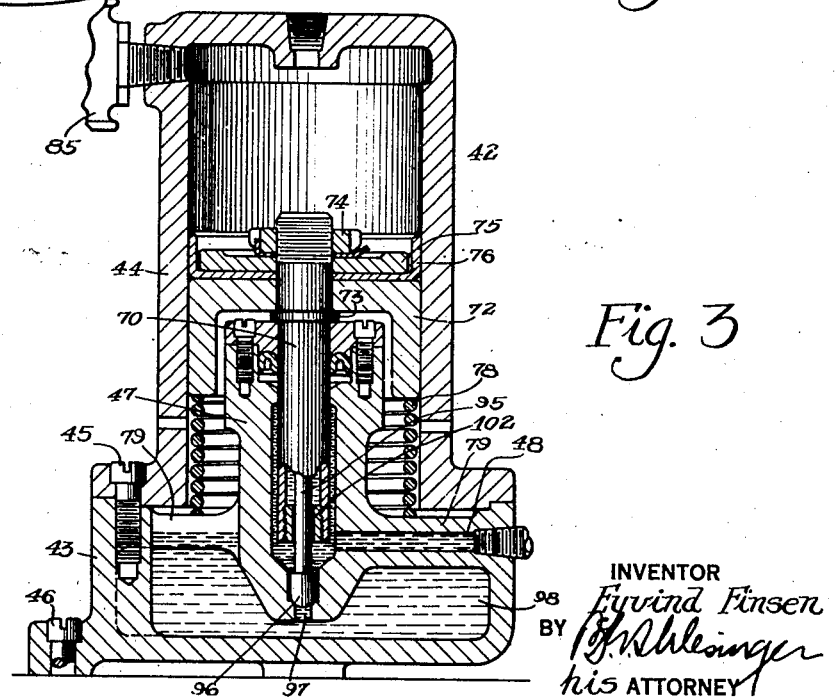
Figure 3 is a sectional view of the plunger-pump and plunger-piston chambers, showing the parts, as contrasted with Figure 2, in chuck-releasing position.
Figure 2:
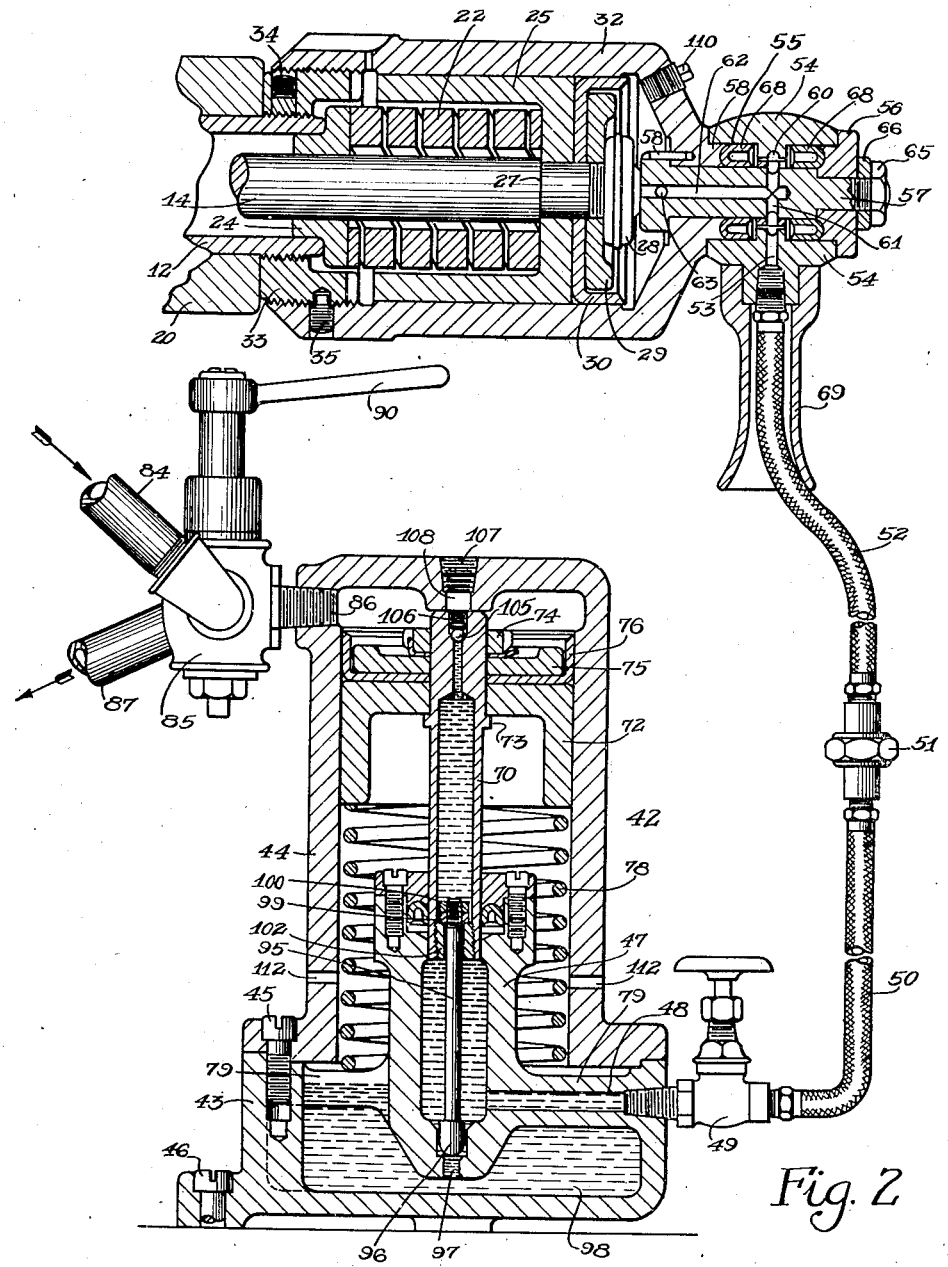
Figure 2 is a layout in section and on an enlarged scale of the chucking mechanism showing the parts in chucking position.

Figure 2 shows the position of the parts when the blank is chucked. The draw-bar is moved and held rearwardly in the bore of the work spindle 12 by the spring 22, thus causing the clamping-disc 17 to hold the gear blank 11 rigidly against the backing-plate 19 of the arbor 18 so that the gear blank will not move relative to the work spindle. In the position shown in Figure 2, also, the plunger 70 of the pump is held in raised position by the action of the spring 78 on the piston 72 which is secured to the plunger. The plunger 78, in turn, holds the valve 96 in raised position so that the plunger system is open and fluid can flow freely between it and the reservoir 98. The valve 85 may be turned to connect the duct 86 with the line 87 leading back to the sump, or, if there were only one chuck on the machine, the valve 85 might be left turned so that the supply line 84 was connected with the line 87 and the oil pumped from the pump 80 would then by-pass through the valve 92 (Fig. 1). When it is desired to release the chuck as, for instance, after the gear blank has been cut and the work head is drawn clear of the tool, the lever 90 is turned to connect the supply line 84 with the duct 86. The motive fluid now flows into the chamber 42, forcing the piston 72 downwardly and compressing the spring 78. The downward movement of the piston 72 forces the plunger 70 downwardly, also, forcing, first of all, the valve 96 into its seat and closing the duct 97. Then in its continued downward movement, the plunger forces oil or whatever fluid is contained in the plunger-pump system, out of the pump chamber 47 through the duct 48, the valve 49, which is normally open, the lines 50, 51, 52, and the ducts 53, 60, 61, 62, and 63 into the cylinder 32, forcing the piston 25 forward against the resistance of the spring 22 to release the clamping disc 17 and permit the horseshoe washer 16 and disc 17 to be removed by the operator to allow removal of the gear blank. The positions of the parts of the chamber 42, when the chuck is released, are shown in Figure 3. These positions are maintained as long as the valve 85 is open.

When a new blank has been placed in position and the clamping-disc 17 and horseshoe washer 16 have been replaced on the draw-bar 14, the operator chucks the blank by turning the lever 90 to connect the duct 86 with the exhaust line 87. The springs 22 and 78 then cooperate to raise the plunger 70 and valve 72 and force the fluid in the cylinder 32 out of that cylinder back into the plunger-pump 47. Just before the plunger reaches the end of its upward movement, the valve 96 is opened, opening the plunger-pump system to the reservoir 98. The draw-bar is returned to the position shown in Figure 2, and the blank chucked.

Since the plunger-pump system depends for its operation upon the action of a constant volume of liquid, it is necessary to exclude air entirely from this system. If there were any air in the system, it would simply compress on the down-stroke of the plunger 70 and the chuck would not be released. To exclude air from the system, one step is to close the valve 49 and open the ball-valve 105 in the head of the plunger 70. This ball-valve is ordinarily held closed by a set-screw 106. It can be opened by threading the plug 107 out of the head of the cylinder 44 and inserting a screw-driver through the opening 108. Once the valve 105 has been opened, the piston 72 is moved up and down by manipulating the lever 90, until oil seeps around the set-screw 106, thus signifying that the pump chamber 47 is empty of air. The set-screw 106 is then threaded up again to force the valve 105 back into its seat.

To exclude air from the rest of the system, the valve 49 is reopened, the plug 110 in the wall of the cylinder 32 is unthreaded and the plunger-pump actuated until fluid seeps around this plug, signifying that this part of the system is free of air. The plug 110 is then tightened up again.

Before the cylinder 44 is assembled on the base 43, the reservoir 98 can be filled and the fluid in this reservoir can be replenished at any time through the openings 112 in the cylinder wall, there being openings between the webs 79 of the base-casting.

By properly proportioning the areas of the piston 72, plunger 70 and piston 25, it will be seen that a very slight pressure from the pump 80 will compress a very heavy coil-spring 22. Thus, if the pump 80 pumps fluid with a pressure of forty pounds to the square inch and the area of the piston 72 is ten square inches, a pressure of four hundred pounds will be exerted on this piston. Then, if in turn, the area of the plunger 70 is one-half a square inch, a pressure of eight hundred pounds per square inch will be exerted on the fluid in the pump-chamber 47. If the area of the piston 25 is ten square inches, this pressure when applied to the piston 25, will be eight thousand pounds. Hence, a spring 22 capable of exerting anything up to eight thousand pounds chucking pressure can be employed in the chuck and the pressure of the spring can be released by simply manipulating the lever 90. The relief-valve 92 governs the pressure which is applied to the piston or pistons 72. The relief-valve 114, inserted in the line 82, governs the pressure of the cutting-oil or coolant.

While the invention has been described in connection with a particular embodiment and in connection with a particular use for that embodiment, it is understood that it is capable of various further modifications and uses and that this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The combination with a work spindle, of chucking mechanism for securing a work-piece to said spindle comprising a draw-bar reciprocable in the bore of said spindle, spring means constantly urging said draw-bar into chucking position, and fluid-pressure operated means for moving said bar to released position against the action of said spring, of a plunger pump for supplying said fluid pressure, fluid-pressure operated means for actuating said pump, and a valve controlling the operation of the latter means.

2. The combination with a work spindle, of chucking mechanism for securing a work-piece to said spindle comprising a draw-bar reciprocable in the bore of said spindle, spring means urging said draw-bar into chucking position, and fluid-pressure operated means for moving said draw-bar to released position against the actuation of said spring, of a plunger pump for supplying said fluid pressure, a piston secured to the plunger of said pump exteriorly of the pump chamber, a cylinder in which the latter piston is reciprocable, means for supplying fluid under pressure to the latter cylinder to actuate said pump, means for returning the pump plunger to inoperative position when the latter supply is shut off, and a valve controlling the latter supply.

3. The combination with a work spindle, of chucking mechanism for securing a work-piece to said spindle comprising a draw-bar reciprocable in the bore of said spindle, a piston secured to said draw-bar, spring means operating against one face of said piston to urge said draw-bar back to chucking position, and a plunger pump for supplying fluid under pressure to the opposite end of said piston to release said chuck, of a piston secured to the plunger of said pump exteriorly of the pump chamber, a cylinder in which the latter piston is reciprocable, means for supplying fluid under pressure to the latter piston to actuate the pump, means for returning the latter piston and with it the plunger pump to inoperative position when the latter supply is shut off, and a valve controlling the latter supply, the area of the latter piston being greater than the area of the plunger whereby the pressure per unit area applied by the pump to the first named piston is greater than the pressure per unit area applied to the latter piston.

4. In a machine of the class described provided with a fluid pump operated by the motive power of the machine, the combination with a work spindle and chucking mechanism for securing a work-piece to said spindle comprising a draw-bar reciprocable in the bore of said spindle, spring means urging said draw-bar into chucking position, and fluid-pressure operated means for moving said draw-bar to released position against actuation of the spring, of a plunger pump for supplying said pressure fluid, a piston secured to the plunger of said pump exteriorly of the pump chamber, a cylinder in which the latter piston is reciprocable, means connecting the fluid pump to the latter cylinder to actuate the plunger pump, means for returning the pump plunger to inoperative position when the latter supply is shut off, and a valve controlling the latter supply.

5. In a machine of the class described provided with a fluid pump operated by the motive power of the machine, the combination with a work spindle and chucking mechanism for securing a work-piece to said spindle comprising a draw-bar reciprocable in the bore of said spindle, a piston secured to said draw-bar, spring means operating against one face of said piston to urge said draw-bar into chucking position, and a plunger pump for supplying fluid under pressure to the opposite end of said piston to release said chuck, of a piston secured to the plunger of said pump exteriorly of the plunger pump chamber, a cylinder in which the latter piston is reciprocable, means connecting the fluid pump to the latter cylinder to supply fluid under pressure to actuate the plunger pump, means for returning the latter piston and with it the pump plunger to inoperative position when the connection is shut off, and a valve controlling said connection, the area of the latter piston being greater than the area of the plunger whereby the pressure per unit area applied by the plunger pump to the first named piston is greater than the pressure per unit area applied by the fluid pump to the latter piston.

6. The combination with a work spindle, and chucking mechanism for securing a work-piece to said spindle comprising a draw-bar reciprocable in the bore of said spindle, spring means urging said draw-bar into chucking position, and means for applying fluid pressure to said draw-bar to move the same to released position comprising a plunger pump operatively connected with said draw-bar and connected, also, separately to a source of fluid supply, and provided with a valve adapted to be closed to shut off said source of fluid supply when the plunger is depressed in the chamber of said pump to pump fluid from said chamber to operate the draw-bar and adapted to be opened when the pump plunger is moved to inoperative position, of a piston connected to the plunger of said pump, and means for moving said piston in opposite directions to move said plunger in opposite directions in the pump chamber.

7. The combination with a work spindle, and chucking mechanism for securing a work-piece to said spindle comprising a draw-bar reciprocable in the bore of said spindle, a piston secured to said draw-bar, spring means operating against one face of the piston to urge said draw-bar into chucking position, and means for applying fluid pressure to the opposite end of said piston to release the chuck comprising a plunger pump having an opening to a source of fluid supply and connected to the opposite side of the piston to supply fluid thereto and provided with a valve operable on movement of the plunger to inoperative position to open said opening and on actuating movement of the plunger to close said source of supply to permit said pump to function, of a piston connected to the plunger, a cylinder in which said piston is reciprocable, spring means normally urging the latter piston and with it the plunger pump to inoperative position, and means for applying fluid pressure to the opposite side of the latter piston to actuate the pump.

8. In a machine of the class described provided with a fluid pump operated by the motive power of the machine, the combination with a work spindle and chucking mechanism for securing a work-piece to said spindle comprising a draw-bar reciprocable in the bore of said spindle, a piston secured to said draw-bar, spring means operating against one face of said piston to urge said draw-bar into chucking position, and means for applying fluid pressure to the opposite end of said piston to release said chuck comprising a plunger pump having an opening to a source of fluid supply and connected to the opposite side of said piston to supply fluid under pressure thereto and provided with a valve operable to open said plunger pump to said source of fluid supply on movement of the plunger of said plunger pump to inoperative position and operable on actuating movement of said plunger to close said source of supply to permit said plunger pump to function, of a piston connected to the plunger, a cylinder in which said piston is reciprocable, spring means acting against one face of the latter piston and normally urging the latter piston and with it the plunger to inoperative position, means connecting the fluid pump with the opposite face of the latter piston to actuate the plunger of the plunger pump, and a valve controlling the latter connection.

9. In a machine of the class described, the combination with a cutting tool, a work spindle, and a fluid pump adapted to supply coolant at the point of engagement of the tool and the work during cutting, of means for securing a work-piece to said spindle, said means being spring-actuated into chucking position and released by fluid pressure, and means for supplying said fluid pressure comprising a plunger pump and a piston connected to said plunger pump for operating the same, and means connecting the plunger pump to said first named fluid pump for actuating said plunger pump.

10. A chucking mechanism comprising a reciprocable draw-bar, a piston secured to said draw-bar, spring means for moving the piston in one direction, and fluid-pressure operated means for moving the piston in the opposite direction, said last named means comprising a plunger pump having fluid-pressure connection with the first piston, and a piston connected to the plunger of the pump and reciprocable to reciprocate said plunger, and a valve controlling the movement of said second piston.

11. In a machine of the class described provided with a fluid pump operated by the motive power of the machine, a chucking mechanism comprising a reciprocable draw-bar, a piston secured to said draw-bar, spring means for moving the piston in one direction and fluid pressure operated means for moving the piston in the opposite direction, said last named means comprising a plunger pump having fluid pressure connection with the first piston, a piston connected to the plunger of the pump and reciprocable to reciprocate said plunger, means connecting the fluid pump to the second named piston for supplying fluid under pressure to said piston, and a valve controlling the movement of the second piston.

12. A chucking mechanism comprising a reciprocable draw-bar, a piston secured to said draw-bar, spring means for moving the piston in one direction, and fluid-pressure operated means for moving the piston in the opposite direction, said last named means comprising a plunger pump connected to the first piston in such way as to provide a substantially closed hydraulic system adapted to contain a substantially constant volume of fluid, and a piston connected to the plunger of the pump, reciprocable to reciprocate said plunger and a valve controlling the movement of the second named piston, the area of the second piston being greater than the area of the plunger whereby the pressure per unit area produced by the plunger pump is greater than the pressure per unit area applied to the second piston.

EYVIND FINSEN.